United States Patent [19]
Budd et al.

[11] Patent Number: 6,014,189
[45] Date of Patent: Jan. 11, 2000

[54] TRANSMISSIVE LIQUID CRYSTAL CELL WITH TRENCH CAPACITOR

[75] Inventors: Russell Alan Budd, North Salem; George Liang-Tai Chiu, Cross River; Dale Jonathan Pearson, Yorktown Heights, all of N.Y.

[73] Assignee: International Business Machines Corporation, Armonk, N.Y.

[21] Appl. No.: 08/749,746

[22] Filed: Nov. 15, 1996

[51] Int. Cl.[7] .................................................. G02F 1/1343
[52] U.S. Cl. ................................................ 349/39; 257/59
[58] Field of Search ................................. 349/39; 257/59, 257/72

[56] References Cited

U.S. PATENT DOCUMENTS 5,835,168  11/1998  Takeda et al. ............................. 349/38

OTHER PUBLICATIONS

J.P. Salerno et al., "Single Crystal Silicon Transmissive AMLCD", SID Digest, Paper 5.7, pp. 63–66, 1992.

*Primary Examiner*—James A Dudek
*Attorney, Agent, or Firm*—Daniel P. Morris

[57] ABSTRACT

An apparatus and method for providing a display cell structure based on the transmissive liquid crystal technology with a useful aperture ratio even as the cell size shrinks to less than 20 microns. The invention overcomes a problem of the prior art wherein the fractional area transmitting the light of the conventional designs becomes unacceptably low due to the aperture reducing opaque storage capacitor. This reduction in aperture ratio is removed in this invention by hiding the trench capacitor below the row and column x,y lines. The cell storage capacitor is formed using a vertical trench capacitor in SOI. Although useful even in standard display sizes and configurations, the invention is particularly useful for head-mounted displays and/or optical projection displays at the UXGA form factor for both monochromatic and color displays. Alternate capacitor configurations are described.

8 Claims, 11 Drawing Sheets

TRANSMISSIVE LIQUID CRYSTAL CELL WITH TRENCH CAPACITOR

FIELD OF THE INVENTION

The present invention is directed to the field of liquid crystal displays. It is more specifically directed to LCD cell light transmission.

BACKGROUND OF THE INVENTION

It is a constant endeavor to find ways of reducing the cell size of liquid crystal displays. An important consideration is to sustain light transmission efficiency as the cell size is reduced by maintaining the fractional area of the display through which the light is transmitted. It is noted that display cell structures that are based on the transmissive liquid crystal technologies are well developed. These structures take advantage of simple and low cost optics. However, as the display cell size is made to shrink to 20 microns or less, the fractional area transmitting the light, called the aperture ratio, of the conventional designs becomes unacceptably low. This is primarily due to the light obscuring properties of the opaque areas within each pixel taken up by the row and column lines, the transistor-thin-film (TFT), and the storage capacitor. This becomes a critical performance problem when considering for example the needs of monochromatic head-mounted or optical projection displays required for a UXGA form factor. These require provision of 1600× 1280 pixels, each with a cell size of 18×18 $\mu m^2$. A comparable colored display requires a cell size of 6×18 $\mu m^2$. A useful display should provide an aperture ratio of greater than 30%.

A prior art pixel layout for a thin-film transistor liquid crystal display is shown in FIG. 1. FIG. 1 shows a single pixel 100 with its associated components in the path of the light transmission. The data line 102 defines the pixel's vertical boundary. The gate line 106 defines the pixel's horizontal boundary. A TFT 104 is formed at a junction of the gate line and the data line. The cell capacitor 112 is shown running horizontally along the lower portion of the aperture 110. The size of the aperture 110 shown is reduced by the presence of the capacitor 112 by 10–20%. As the cell size is reduced further, the capacitor takes a larger percentage of the otherwise available aperture area.

FIG. 2 shows the equivalent electrical circuit of a pixel 200. It shows a vertical data line 202 and a horizontal gate line 204. A thin film transistor 212 has its gate terminal connected to the gate line 204 and its source terminal connected to the data line 202. An inherent liquid crystal common electrode capacitor $C_{LC}$ 206 occurs between the TFT's drain 214 and the common electrode 210. It nominally has a capacitance of 1 femto-Farad. A storage capacitor $C_s$ 208 is formed between the TFT drain 214 and the common electrode 210, normally at ground potential. $C_s$ 208 needs to be in the range of 20–100 femto-Farad. The placement and formation of this storage capacitor $C_s$ 208 are the subject of the present invention. As fabricated previous to this invention the storage capacitor significantly reduces the aperture area so that none of the existing transmissive liquid crystal cells on poly-Silicon or C—Si can be scaled to the very small cell sizes required while maintaining a 30% aperture ratio. Two alternatives have been suggested. One is to use reflective cells. This approach requires more expensive optical components. The other approach calls for self-luminous cells such as the LED, electroluminescence, or organic-LED cells. All self-luminous cells face a differential aging problem. This problem is still a material-related unknown at the present time.

In prior liquid crystal displays, the storage capacitor obscures about 10 to 20% of a large cell's region through which light is transmitted in the transmissive display. The percentage of region obscured by the storage capacitor in a display with a small cell size becomes almost intolerable. The present invention solves this problem by using a vertical trench capacitor which is hidden behind the row and column lines such that the region of each pixel through which light passes is obscured only by a single transistor and the row and column x and y lines.

SUMMARY OF THE INVENTION

It is an object of the present invention to provide a structure and method for a display being used even in ixels less than 20 microns wide. In one aspect the present invention provides a display structure comprising an array of pixels. Each pixel has a perimeter defined by a pair of row lines and a pair of column lines. The lines enclose a light passing area defining an aperture. Each pixel has a thin film transistor coupled to the lines, and a capacitor formed behind at least one of the lines defining that pixel such as to limit the amount of area being obscured by the capacitor. In an embodiment of the structure, the row line is a gate line defining a gate electrode, the column line is a data line defining a data electrode and the capacitor is a storage capacitor. In an embodiment of the structure the capacitor is formed into an etched out area in at least one of the lines. In an embodiment the thin film transistor is formed in an inverted staggered structure configuration. In an embodiment the capacitor is formed in a 'L' shaped configuration.

In an aspect the present invention a display pixel storage capacitor is formed in a trench etched out of a C-Silicon (crystalline-Silicon) layer behind at least one of the row and/or column lines, and the trench is surrounded by an insulating layer filled with polysilicon. In one embodiment the present invention provides a display structure wherein the array of pixels is formed by a plurality of liquid crystal cells extendible to a resolution required for UXGA light transmission for head-mounted displays and projection displays.

Another aspect of the present invention is to provide a method for forming a display structure having an array of pixels. Each pixel is defined by crossing essentially vertical and horizontal lines. The method comprises the steps of: providing a semiconductor on insulator substrate; patterning a plurality of trench profiles for each pixel along a portion of at least one of the lines; etching away material from the semiconductor within the profiles to form a plurality of trenches; insulating an inside surface of each trench; filling each trench with a conductive material to form a plurality of first capacitor electrodes for a plurality of capacitors; patterning a plurality of second capacitor electrodes to surround each trench; etching away the silicon outside the patterned second electrode areas to form a clear area within each pixel; insulating the horizontal lines; depositing a gate line along the horizontal lines; depositing a plurality of semiconductor stacks, wherein each stack is coupled to one of the horizontal lines, one of the vertical lines, and to one of the capacitors; depositing a layer of conducting material within the clear area to form a third electrode by which a liquid crystal is switched between ON and OFF; insulating the vertical lines; depositing a metal data line along the vertical lines and having a portion forming a source for each of a plurality of transistors; and forming a drain contact for each transistor overlapping a portion of the indium tin oxide and the first capacitor electrode thereby forming a lower substrate.

In one embodiment the method further comprises the steps of: passivating the lower substrate; providing an upper substrate and liquid crystal; and assembling the lower substrate with the upper substrate separated by the liquid crystal to form at least a portion of a liquid crystal display. In one embodiment of the method the conductive material is polysilicon. In one embodiment of the method the trenches are formed in an 'L' shape. In one embodiment of the method the conducting material is indium tin oxide. In one embodiment of the method the semiconductor in insulator substrate is a silicon on insulator substrate.

Still another aspect of the present invention is to provide a method for forming a display structure having an array of pixels defined by horizontal and vertical lines and increased aperture ratio. The method comprises the step of forming each storage capacitor to be hidden behind at least one of the lines.

Another aspect of the present invention is to provide a display structure comprising a plurality of pixels defined by the crossings of two substantially vertical lines with two substantially horizontal lines. The lines are covered by insulated metal lines. Each pixel comprises: a thin film transistor coupled to the metal lines; a storage capacitor formed behind at least one of the lines and coupled between the transistor and at least one of the lines. In one embodiment the storage capacitor is formed in a trench etched out of at least one of the lines.

BRIEF DESCRIPTION OF THE DRAWINGS

These and other objects, features, and advantages of the present invention will become apparent upon further consideration of the following detailed description of the invention when read in conjunction with the drawing figures, in which.

DETAILED DESCRIPTION OF THE INVENTION

The present invention is for a method and apparatus to provide an increased pixel aperture ratio for cells of very small size while employing the well developed transmissive liquid crystal technologies. This allows the display implementation to use the least expensive transmission optics available. This is accomplished by forming the cell storage capacitor using a vertical trench capacitor. The prior art storage capacitor construction can reduce the cell aperture ratio by 10–20%. This reduction in aperture ratio due to light obstruction by the physical storage capacitor is removed in this invention by forming and thereby hiding the trench capacitor behind the row and column lines.

In one embodiment of this invention the process starts from the silicon-on-insulator, SOI, substrate, within which vertical trenches are etched using a variation of a DRAM process. A thin oxide layer of approximately 50 angstroms is grown. Alternatively, layers of oxide/nitride may be used. The etched trenches are then filled with polysilicon that serves as the inner electrode. Poly-silicon is shown to be used here rather than amorphous silicon because of the smallness of the display size and because the polysilicons have better conductivity. Next, the TFTs are built. The drain side of the cell TFT is electrically connected to the poly-Si side of the trench capacitor. The single crystal side of the trench capacitor becomes a common electrode connected to the substrate. The trench capacitor is designed to achieve a capacitance greater than 20 femto-Farad. Rows and column lines are patterned. The remaining liquid crystal cell structures are generally the same as in conventional cells.

Figure 3A:
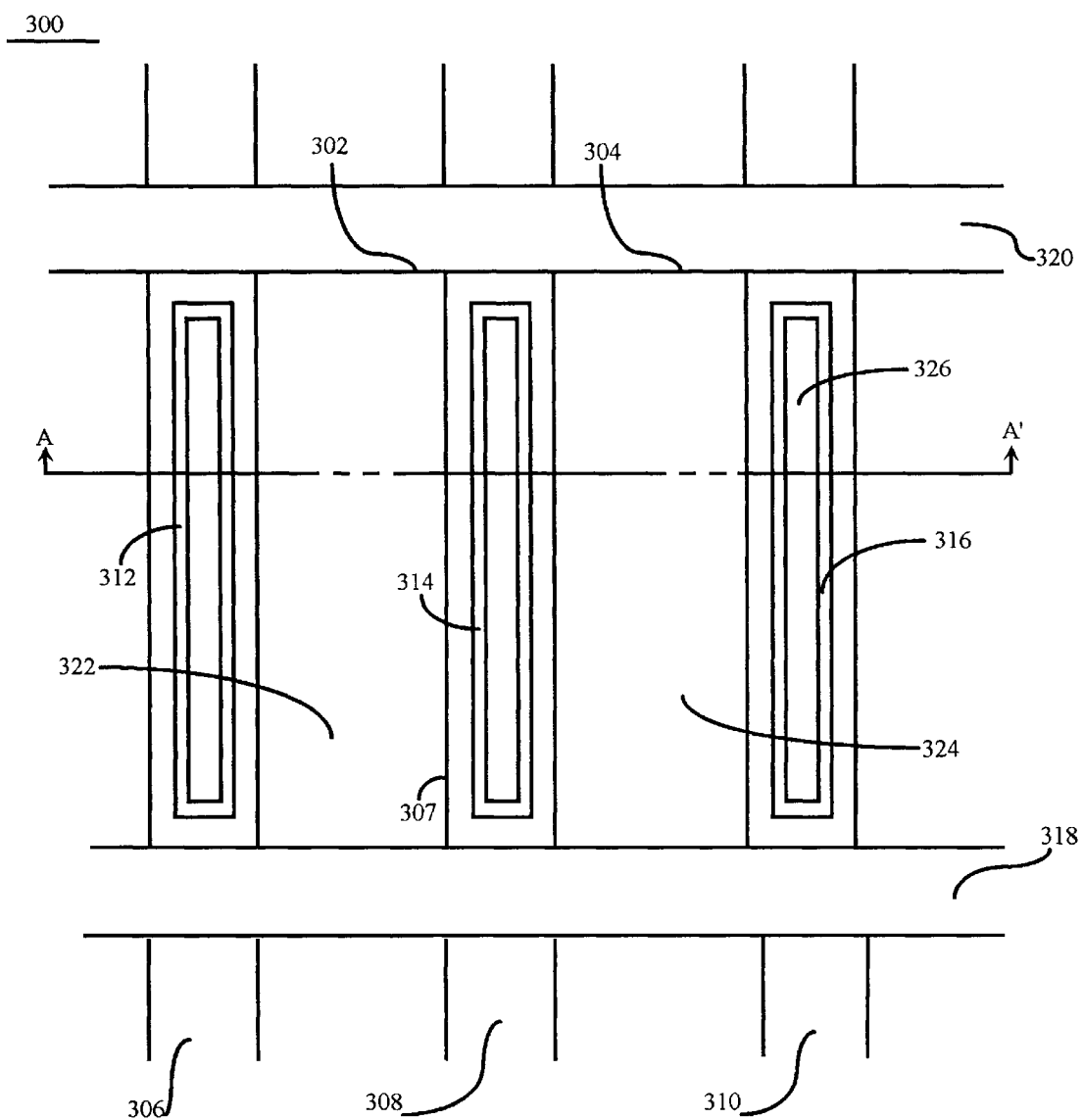
FIG. 3(a) shows a top view of two complete pixels included in a pixel array of liquid crystal cells with trench capacitors in accordance with the present invention.
Figure 3B:
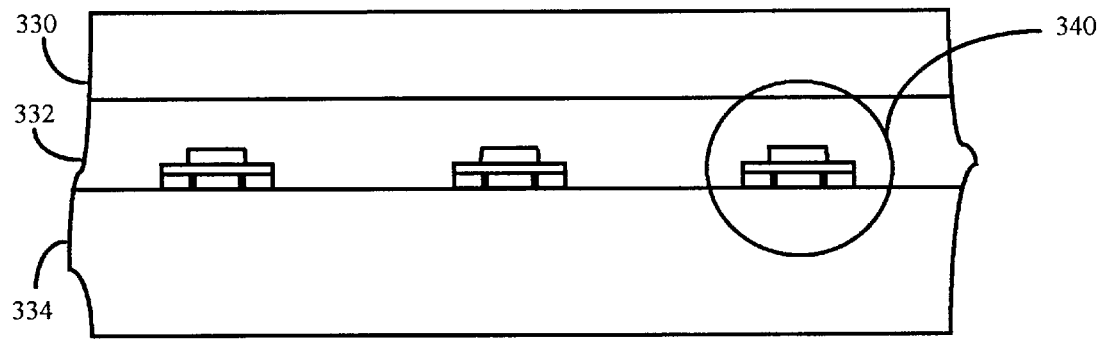
FIG. 3(b) shows an edge view of the pixel array of FIG. 3(a)

FIGS. 3(a) and 3(b) show an embodiment of a liquid crystal cell with trench capacitors in accordance with the present invention. FIG. 3(a) shows a top view of two complete pixels, 302, 304 included in a pixel array. Pixel 302 includes a portion of column line 306, the edge 307 of column line 308, and the portions of a pair of row lines 318 and 320 that pass between these columns. It has a trench capacitor 312 behind column 306 and a clear aperture area 322 surrounded by there rows and columns. Similarly, pixel 312 includes a portion of column 308, the edge 309 of column 310, and the portions of rows 318 and 320 passing between these columns. It has an associated trench capacitor 314 behind column 308 and a clear aperture area 324. A third trench capacitor 316 having a trench area 326 is also shown.

FIG. 3(b) shows an edge view 'A—A' of the pixel array. It includes the cover glass 330 and the transparent substrate 334 upon which the pixel array is formed. The cover glass 330 is separated from the transparent substrate 334 by the liquid crystal 332.

Figure 3C:
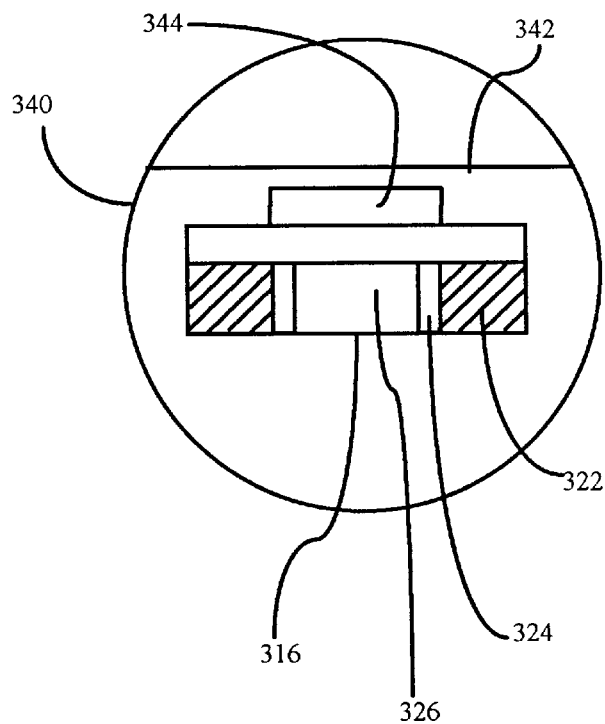
FIG. 3(c) shows an exploded edge view of a column line including the trench capacitor.

An exploded edge view 340 of column line 310 including trench capacitor 316 is shown in FIG. 3(c). It shows capacitor 316 formed by an insulating oxide layer 324 lining the vertical trench 326. The trench 326 is etched into the C—Si 322 on substrate 334 and is filled with a conducting material that serves as an inner electrode. This material is often polysilicon. The capacitor is covered by an insulator 342 upon which a metal layer 344 is formed.

A method to implement an embodiment of the present invention includes the steps to fabricate the liquid crystal cells. The process usually starts with a silicon-on-insulator, SOI, substrate large enough for one or more displays. The insulator is in the order of ½ to 1 mm thick, with a 1 micron layer of silicon. Typical useable transparent insulator materials include silicon on quartz, and silicon on sapphire. The trench capacitor profile is then patterned and etched into the SOI as shown in FIGS. 4(a) and 4(b).

Figure 4A:
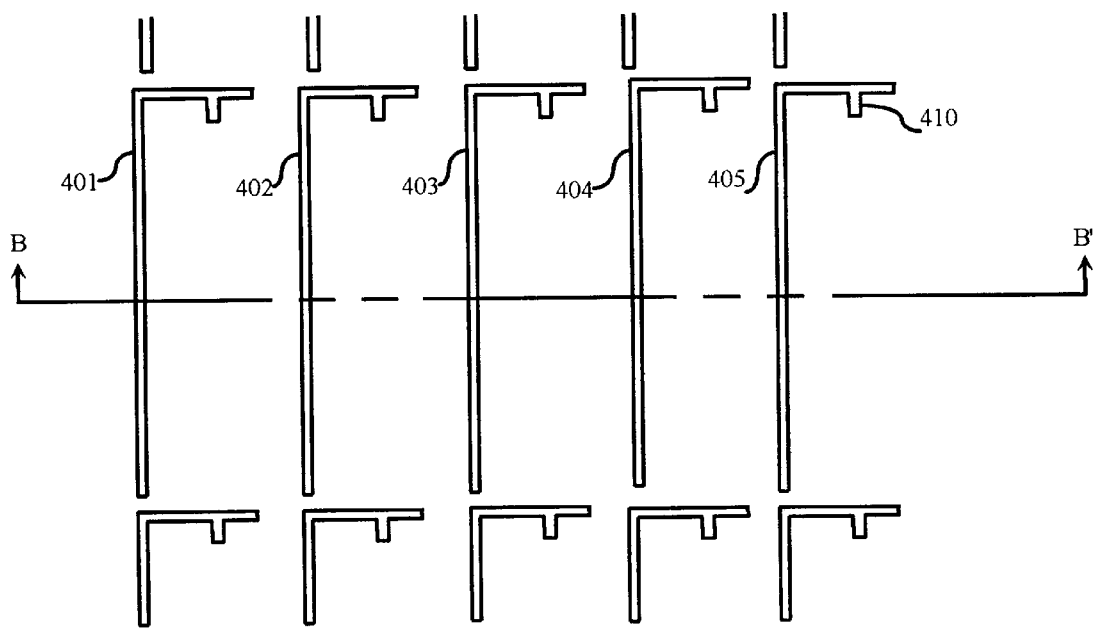
FIG. 4(a) shows an embodiment wherein the trench capacitor profile is patterned and etched into the SOI in accordance with the present invention.

FIG. 4(a) shows an array of blank pixel areas. Each pixel is defined by the outline of an etched profile for a trench capacitor 401–405. The trenches 401–405 shown are an improvement of the trench area shown in FIG. 3(a) in that the trench capacitor area is extended to form an 'L' shape to also include the area under the row lines. Thus, the capacitor formation area is under both the data lines and the gate lines. This unique space utilization results in the ability to form a capacitor with a higher capacitance around a pixel of fixed size, or to obtain a desired capacitance with a pixel having smaller dimensions. Although, the extended capacitor is shown in the form of an 'L', similar space utilizations result by using a capacitor trench in the form of a 'T' overlapping the pixel apertures of adjacent pixels. A stud 410 is included in the etched profile to provide a contact point for a TFT drain electrode.

Figure 4B:
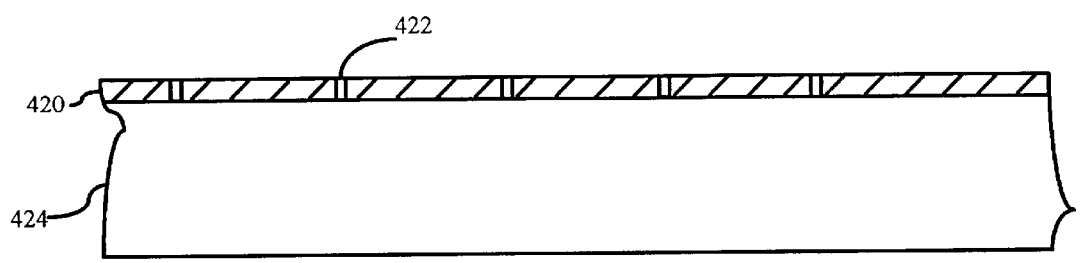
FIG. 4(b) shows an edge view of the etched patterns of FIG. 4(a)

FIG. 4(b) shows an edge view taken along B—B' of the pattern of FIG. 4(a). It shows the patterned C—Si layer 420 containing the etched capacitor profile 422 on top of the transparent substrate 424. The C—Si layer 420 is typically 1 micron thick.

Figure 5A:
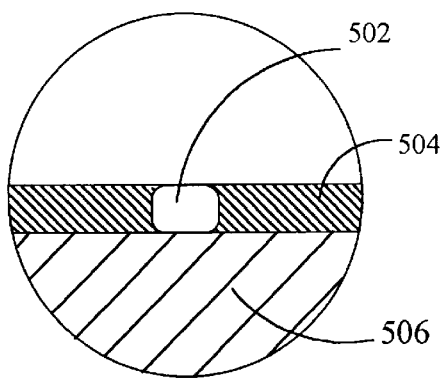
FIG. 5(a) shows the first step for forming a trench capacitor, wherein a typical trench is etched into a C—Si layer on a transparent substrate in accordance with the present invention.
Figure 5B:
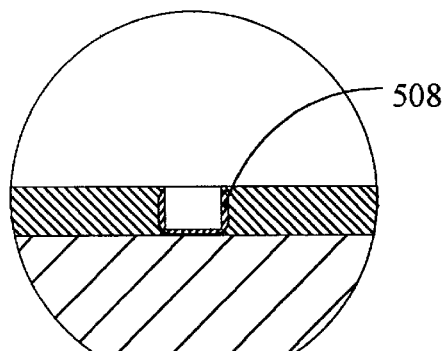
FIG. 5(b) shows a step for forming a trench capacitor, wherein the capacitor is formed by growing and/or depositing an insulator inside the trench.
Figure 5C:
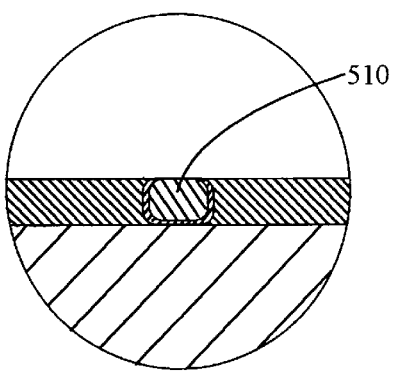
FIG. 5(c) shows a step for forming a trench capacitor, wherein the trench is filled with poly-Si to form a trench electrode.
Figure 5D:
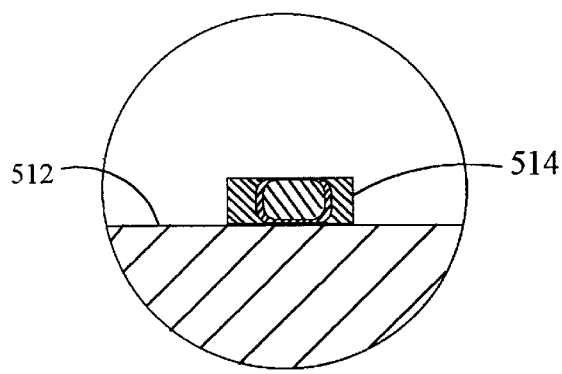
FIG. 5(d) shows a step for forming a trench capacitor, wherein a clear aperture area is formed by patterning and etching away all but a thin portion of the C—Si layer surrounding the trench that serves as a second capacitor electrode.
Figure 5E:
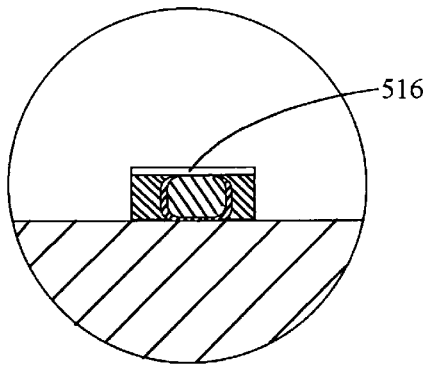
FIG. 5(e) shows a step for forming a trench capacitor, wherein the trench capacitor is covered with an insulator.

The next steps form a capacitor in each trench as shown in FIGS. 5(a) through 5(e). A typical trench 502 etched into a C—Si layer 504 on a transparent substrate 506 is shown in FIG. 5(a). The capacitor is formed by growing and/or depositing approximately 50 Angstroms of an insulator 508 inside the trench as shown in FIG. 5(b). A thin oxide or oxide/nitride layer is typically used as the insulator. Next the trench 502 is filled with poly-Si 510 forming a trench electrode as shown in 5(c). This electrode serves as the inner electrode of the trench capacitor. A clear aperture area is formed by patterning and etching away all but a thin portion 514 of the C—Si layer surrounding the trench that serves as a second capacitor electrode as shown in FIG. 5(d). Then the trench capacitor is covered with an insulator 516 as shown in FIG. 5(e).

Figure 1:
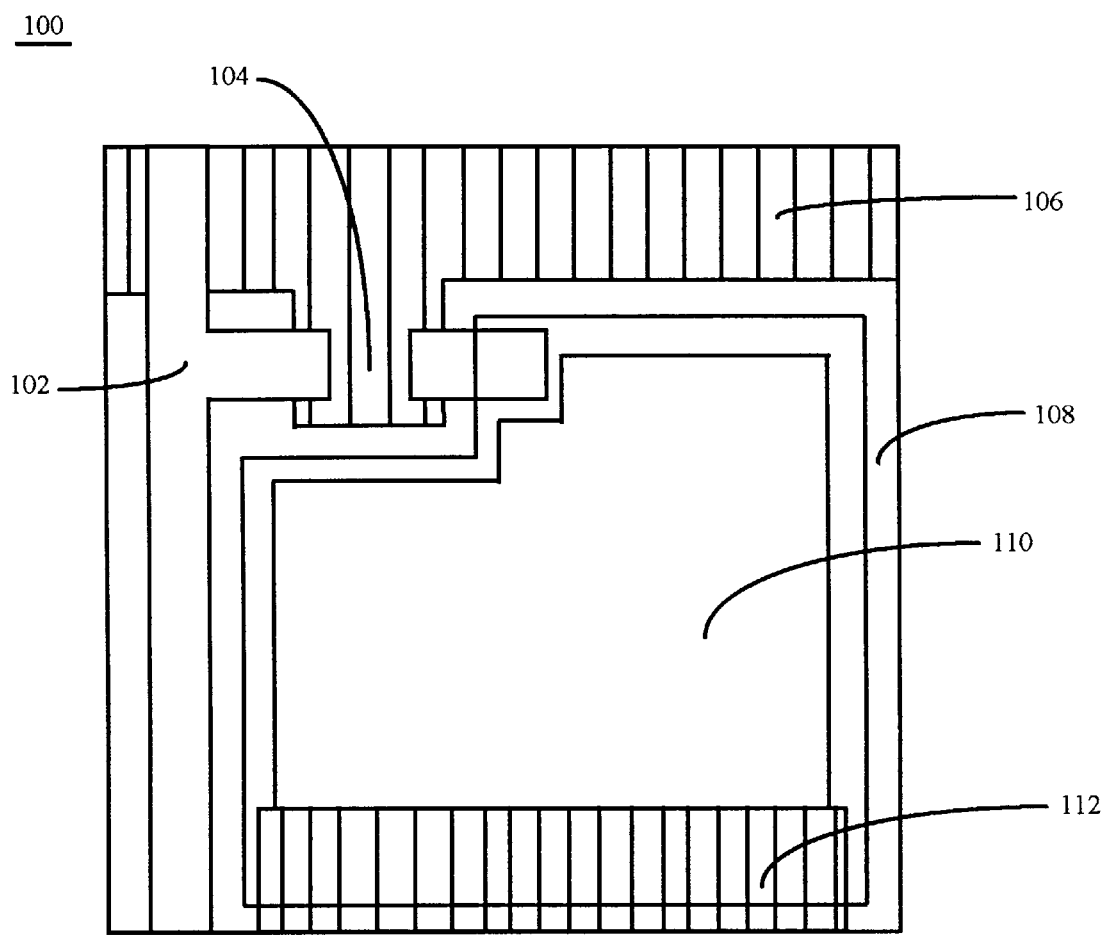
FIG. 1 shows a prior art pixel layout for a thin-film transistor liquid crystal display.
Figure 2:
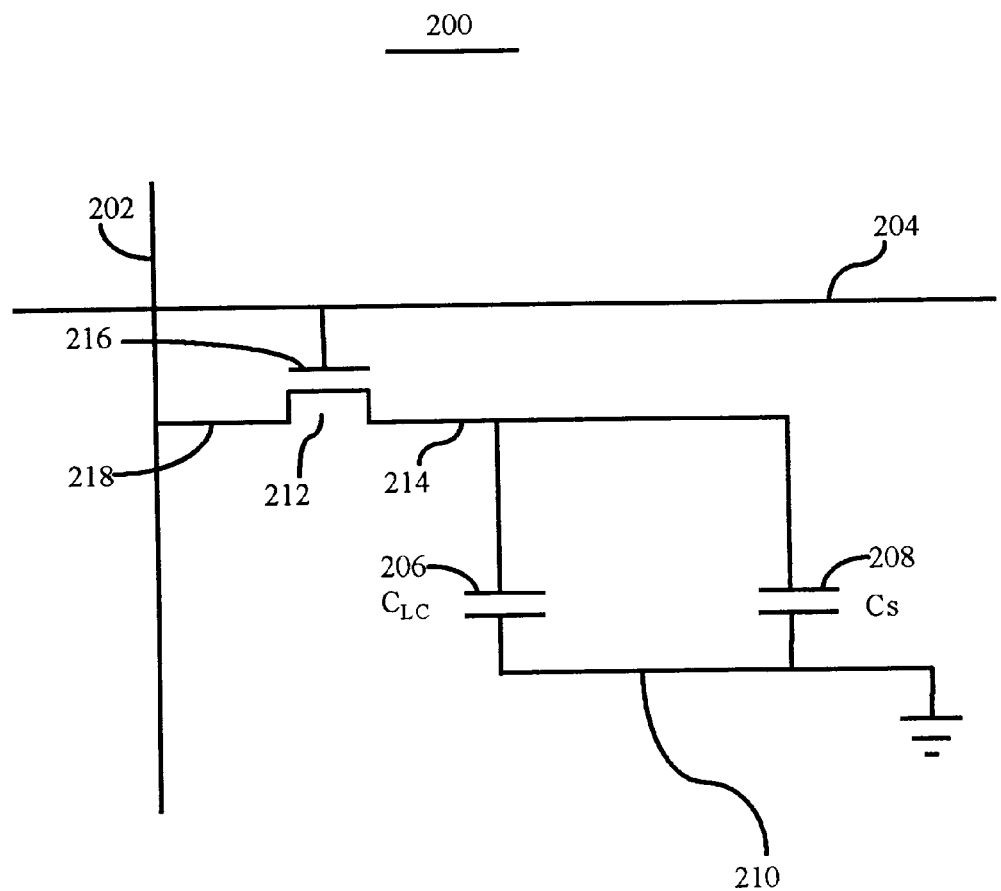
FIG. 2 shows the equivalent electrical circuit of a pixel.
Figure 6A:
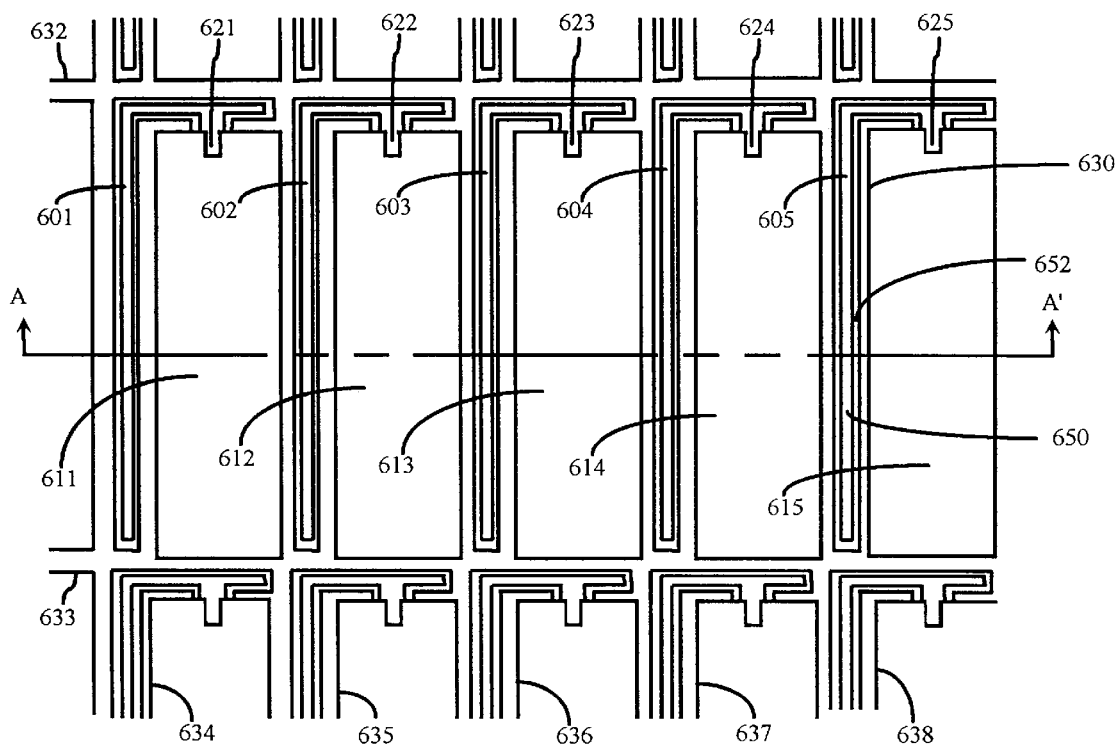
FIG. 6(a) shows the completed 'L' shaped trench capacitor array of capacitors and the clear areas included between them in accordance with the present invention.
Figure 6B:
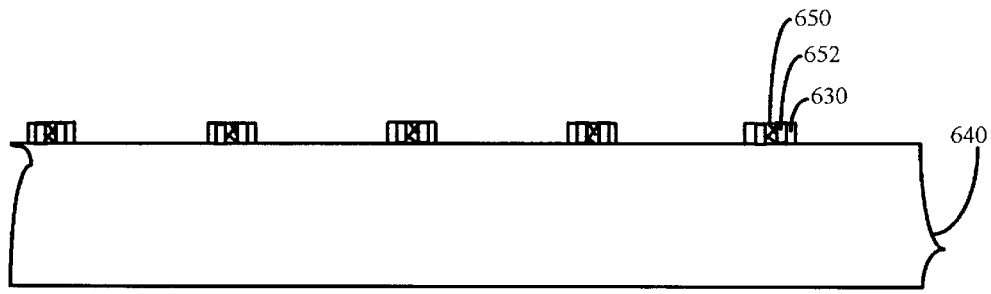
FIG. 6(b) shows an edge view of FIG. 6(a)

FIG. 6(a) shows the completed 'L' shaped trench capacitor array of capacitors 601–605 and the clear areas 611–615 included between them. FIG. 6(b) shows an edge view of FIG. 6(a). Thus, 'L' shaped capacitor 605 is formed by a P-Si inner electrode 650, a thin oxide insulator 652 and a C—Si outer electrode 630 to straddle clear area 615. Clear area 611 is straddled by capacitor 601 and one edge of capacitor 602 and so on. Studs 621–625 are also shown. Each stud protrudes from its respective capacitor's inner electrode and is exposed by an indentation in each of the clear areas 611–615. The remaining unetched portions of the C—Si 630 form the rows 632–633 and columns 634–638 upon transparent substrate 640 shown in FIG. 6(b). The C—Si portions of all the capacitors are shown to be contiguous with each other. This is generally used as the common display electrode and is normally held at ground potential. The process proceeds with the construction of a thin film transistor, TFT, in each clear area to form the pixel circuit arrangement shown in FIG. 2. Each pixel is constructed to include a TFT formed as normally practiced.

Figure 7A:
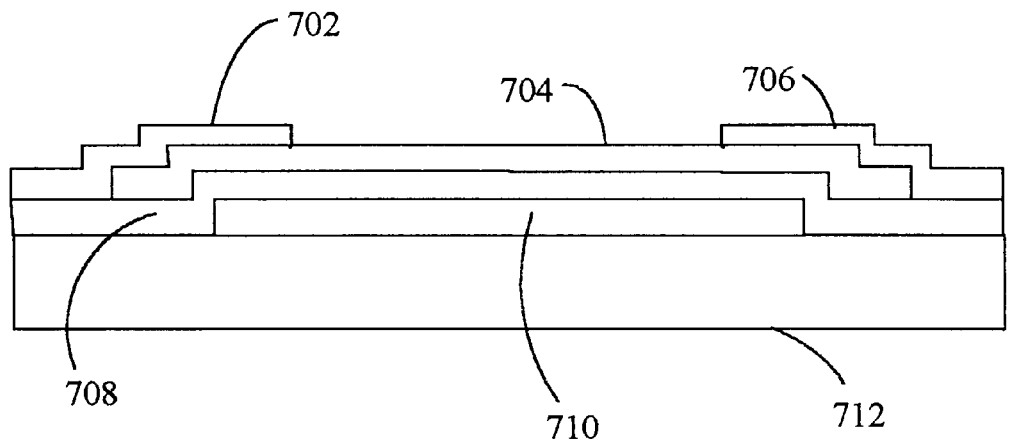
FIG. 7(a) shows a cross section of an inverted staggered TFT structure.
Figure 7B:
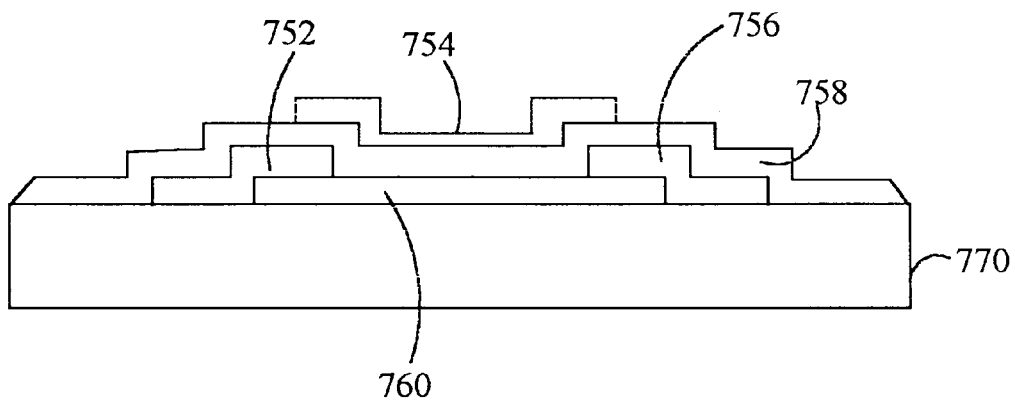
FIG. 7(b) shows a cross section of a coplanar TFT structure.

FIGS. 7(a) and 7(b) show edge views of two TFT formations. FIG. 7(a) shows a cross section of an inverted staggered TFT 700, characterized by a bottom gate electrode and having top drain and source contacts. It shows a transparent substrate 712 upon which a gate 710 is deposited. The gate 710 is covered by a gate insulator 708 upon which a semiconductor 704 is layered. A source 702 and a drain 706 are deposited over semiconductor 704.

An alternative TFT configuration 750 is shown in FIG. 7(b). This configuration is referred to as a coplanar TFT structure because the transistor's gate 754, source 752, and drain 756 electrodes are on the same side of the semiconductor 760. Here also the TFT 750 is formed on a transparent substrate 770 such as glass. The TFT transistors can be made using various active materials. These include CdS, CdSe, Te, polysilicon, amorphous silicon and amorphous germanium. Any of these may be substituted for the materials specified in describing this invention.

Figure 8A:
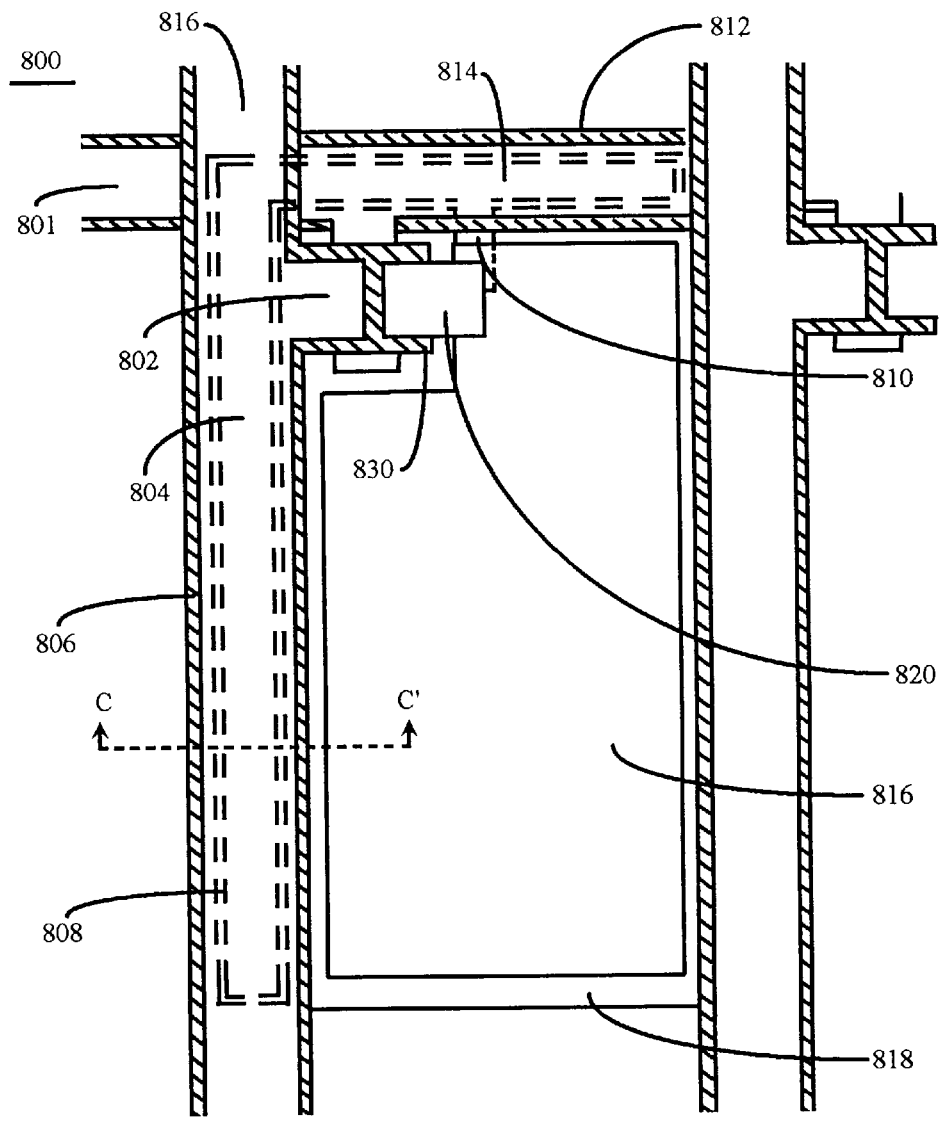
FIG. 8(a) shows an embodiment of the present invention using an inverted staggered TFT configuration.

An embodiment using an inverted staggered TFT is shown in FIG. 8(a). The circuit is formed on a clear substrate 840 as follows. The gate line region of the display row 801 that overlaps the buried trench capacitor 808, is covered with a thin oxide insulator 812. This is followed by the deposition of the gate line 814 itself. A semiconductor stack 830 is deposited over the TFT region to form the TFT. This is performed as shown in FIG. 7(a). A thin layer of indium tin oxide (ITO) 816 is deposited within the clear area. The ITO becomes the lower pixel electrode. The ITO lower electrode 816 is used to switch the state of the liquid crystal ON and OFF. Next, the column region 816 is covered with an insulating layer 806 upon which a metal data line 804 is deposited. The data line 804 has a protrusion 802 that lies over the gate area of the TFT 830 forming the TFT source.

Figure 8B:
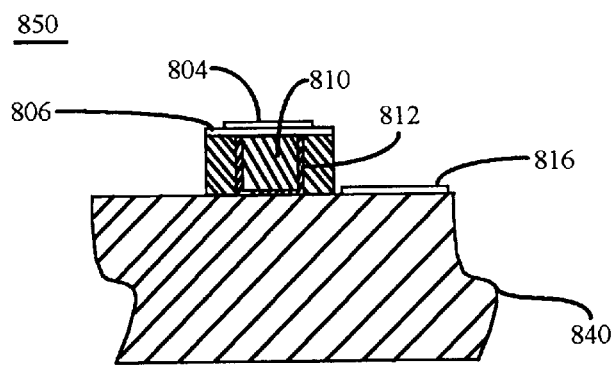
FIG. 8(b) shows an edge view of FIG. 8(a)

Simultaneously with the formation of the data line 804 a drain contact metal 820 is formed. The contact metal 820 is made to overlap the TFT 830, the ITO 816 and the stud of the P-Si trench capacitor inner electrode 810. This completes the circuit of the pixel in a way that has the storage capacitor formed under the metal lines rather than being in the clear area 818. The method described for the single pixel 800 is actually performed simultaneously for a large group of pixels in the pixel array of they display. FIG. 8(b) shows a side view taken along C—C'. The device so formed is completed after it undergoes passivation and the other processes customary with standard TFT pixel cells and results in a completed lower substrate 850. The passivation protects the metal layers and serves as a rubbing layer for alignment of liquid crystals.

Figure 9A:
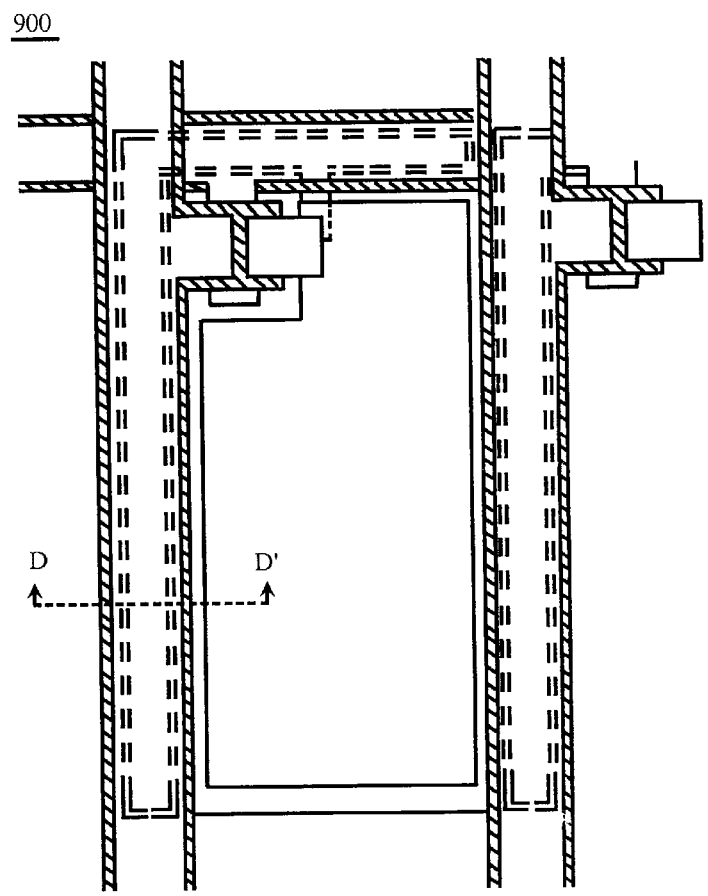
FIG. 9(a) shows a portion of an assembled pixel array in accordance with the present invention.
Figure 9B:
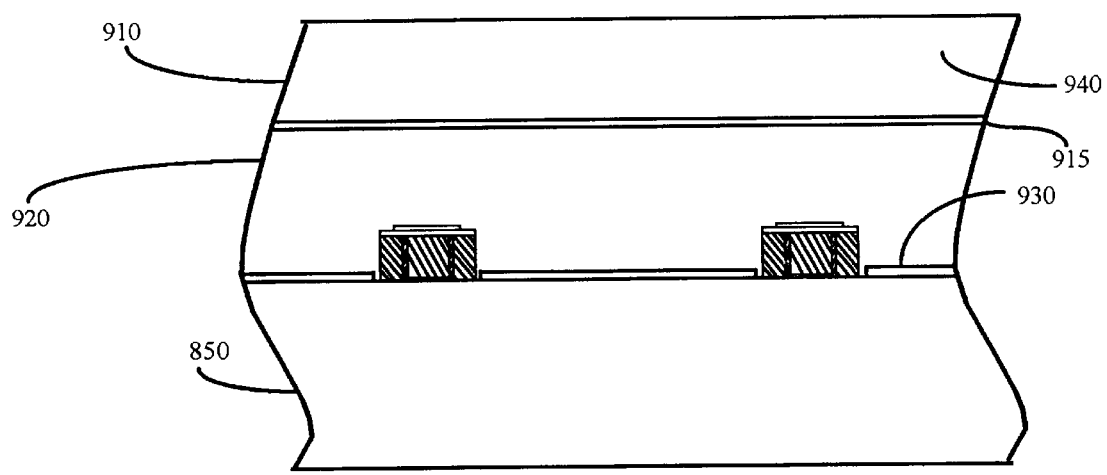
FIG. 9(b) shows an edge view of FIG. 9(a)

FIG. 9(a) shows a portion 900 of an assembled pixel array. FIG. 9(b) shows a side view taken along D—D'. It shows the completed lower substrate 850 and an upper substrate 910 separated by liquid crystal 920. The upper substrate 910 is transparent and is formed with a layer of ITO 915, and a cover glass 940. This ITO layer 915 forms the upper or common electrode of the display. An ITO layer 930 on the lower substrate, lying between the rows and columns, forms the lower electrode of the display. Display pixel ON/OFF switching is accomplished by applying a voltage across these two electrodes.

Figure 10:
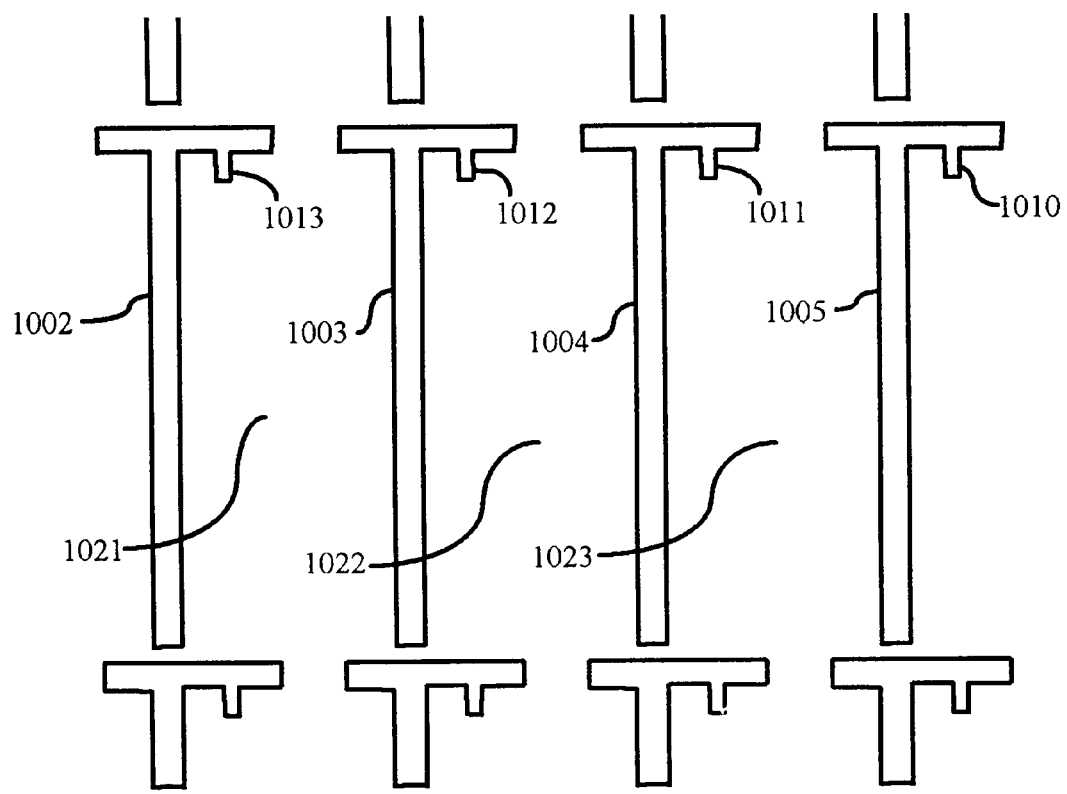
FIG. 10 shows storage capacitors formed in trenches that overlap adjacent pixel areas and are formed in a 'T' shape in accordance with the present invention.

The storage capacitor trench is shown in FIG. 3(*a*) to have a straight shape and in FIG. 4(*a*) to take the form of an 'L' shape. These trench shapes do not overlap adjacent pixel aperture areas and are useful even at display edges. However, other forms may be advantageous to specific applications. FIG. 10 shows storage capacitors 1002–1005 formed in trenches that overlap adjacent pixel area 1021–1023. It shows storage capacitors 1002–1005 formed in a 'T' shape. For example, capacitor trench 1012 overlaps pixels 1021 and 1022. Each capacitor has a stud 1010–113 for connection to the TFT.

Figure 11:
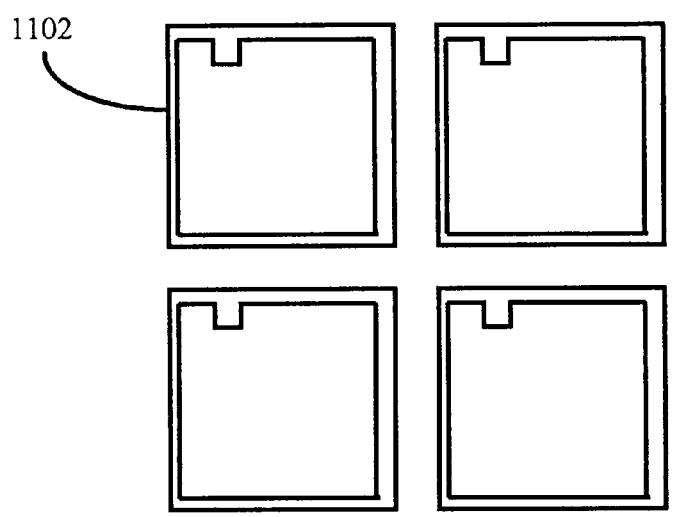
FIG. 11 shows storage capacitors formed in trenches that surround pixel areas and are formed in an 'O' shape in accordance with the present invention.

Still another alternate configuration is to have a trench formed all around each pixel. In this configuration each row and column line is shared by a pair of trenches as shown in FIG. 11. FIG. 11 shows storage capacitors formed in trenches that surround pixel areas and are formed in an 'O' shape in accordance with the present invention, 1102. It is expected that this results in reduced crosstalk from pixel to pixel.

All these trench implementations make use of the already otherwise opaque portions of the display to hide the storage capacitor. It allows the storage capacitor to fill any area behind these portions and follow their contours by taking any shape to provide the required pixel circuit capacitance. The resulting aperture ratio is particularly important in color displays. In color displays three pixel cells are used in combination for provision of a red, green and blue pixel group.

This invention may be used for many application. It also provides a spatial light modulator that can be used even in high resolution head-mounted displays and projection displays. Although the description is made for particular arrangements and applications, the intent and concept of the invention are suitable and applicable to other arrangements and applications. For example, the placement of the storage capacitor behind otherwise opaque areas, also increases the aperture ratio in large display and results in increased operational efficiency. It will be clear to those skilled in the art that other modifications to the disclosed embodiments can be effected without departing from the spirit and scope of the invention.

What is claimed is:

1. A display structure comprising:

an array of pixels, each of said pixels having a perimeter defined by a pair of row lines and a pair of column lines; said lines enclosing a light passing area defining an aperture;

a thin film transistor coupled to said lines; and a capacitor for each pixel of said pixels formed behind at least one of said line defining said each pixel such as to limit an amount of said area being obscured by said capacitor; said capacitor is formed into an etched out area in said at least one of said lines.

2. A display structure comprising:

an array of pixels, each of said pixels having a perimeter defined by a pair of row lines and a pair of column lines; said lines enclosing a light passing area defining an aperture;

a thin film transistor coupled to said lines; and a capacitor for each pixel of said pixels formed behind at least one of said line defining said each pixel such as to limit an amount of said area being obscured by said capacitor; said capacitor is formed in a trench etched out of a C-Silicon layer behind at least one of said lines, said trench being surrounded by an insulating layer filled with polysilicon.

3. A structure as recited in claim 1 or 2 wherein:

said row line is a gate line defining a gate electrode;

said column line is a data line defining a data electrode; and said capacitor is a storage capacitor.

4. A display structure as recited in claim 1 or 2 where said thin film transistor is formed in an inverted staggered structure configuration.

5. A display structure as recited in claim 1 or 2 wherein said capacitor is formed in a 'L' shaped configuration.

6. A structure as recited in claim 1 or 2 wherein said array of pixels is formed by a plurality of liquid crystal cells extendible to a resolution required for UXGA light transmission for head-mounted displays.

7. A display structure comprising a plurality of pixels defined by the crossings of two substantially vertical lines with two substantially horizontal lines; said lines being covered by insulated metal lines, each of said pixels comprising a thin film transistor coupled to said metal lines;

a storage capacitor formed behind at least one of said lines and coupled between said transistor and at least one of said lines, said storage capacitor is formed in a trench etched out of a C-Silicon layer behind at least one of said lines, said trench being surrounded by an insulating layer filled with polysilicon.

8. A display structure comprising a plurality of pixels defined by the crossings of two substantially vertical lines with two substantially horizontal lines; said lines being covered by insulated metal lines, each of said pixels comprising a thin film transistor coupled to said metal lines;

a storage capacitor formed behind at least one of said lines and coupled between said transistor and at least one of said lines;

said storage capacitor is formed in a trench etched out of said at least one of said lines.

* * * * *